(12) United States Patent
Graf et al.

(10) Patent No.: US 8,754,597 B2
(45) Date of Patent: Jun. 17, 2014

(54) COMPACT SWITCHGEAR FOR AN ELECTRICAL CONSUMER

(75) Inventors: Josef Graf, Hahnbach (DE); Norbert Mitlmeier, Ursensollen (DE); Ludwig Niebler, Laaber (DE); Bernhard Streich, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 456 days.

(21) Appl. No.: 12/935,089

(22) PCT Filed: Feb. 25, 2009

(86) PCT No.: PCT/EP2009/052190
§ 371 (c)(1),
(2), (4) Date: Sep. 28, 2010

(87) PCT Pub. No.: WO2009/121666
PCT Pub. Date: Oct. 8, 2009

(65) Prior Publication Data
US 2011/0019327 A1    Jan. 27, 2011

(30) Foreign Application Priority Data
Mar. 31, 2008 (DE) .................. 10 2008 018 254

(51) Int. Cl.
*H01H 47/00* (2006.01)
(52) U.S. Cl.
USPC ............... 318/287; 361/191; 335/8; 307/109; 307/127; 200/61.39
(58) Field of Classification Search
USPC .......... 318/280, 287; 361/139, 142, 160, 166, 361/191, 206; 307/104, 109, 112, 113, 116, 307/125, 127; 335/6–8; 200/42.01, 50.01, 200/61.39
See application file for complete search history.

(56) References Cited

U.S. PATENT DOCUMENTS 2,904,934 A * 9/1959 Schicht .................. 451/114
3,039,036 A * 6/1962 Wendelburg et al. ......... 318/758
(Continued)

FOREIGN PATENT DOCUMENTS

DE    3713537 A1    10/1987
DE    3853731 T2    1/1996
(Continued)

OTHER PUBLICATIONS

Chinese Office Action dated Feb. 25, 2013.
(Continued)

*Primary Examiner* — Bentsu Ro
(74) *Attorney, Agent, or Firm* — Harness, Dickey & Pierce, P.L.C.

(57) ABSTRACT

A switchgear includes a power supply built into a common housing, and at least two drives. The power supply can be fed by an external supply voltage and an external consumer can be connected to the two drives. In at least one embodiment, the switchgear includes, in the same housing, a built-in overload detection for the two drives and/or a built-in circuit breaker function for the two drives, and/or a built-in control circuit for the common control of the two drives. The switchgear can optionally be completed by a transformer providing an additional function of the targeted charging of a buffer capacitor and/or by an energy accumulator providing an additional function of the targeted discharge thereof by temporarily switching on a connected consumer.

16 Claims, 4 Drawing Sheets

(56) References Cited

U.S. PATENT DOCUMENTS

| | | | | |
|---|---|---|---|---|
| 3,772,579 | A | * | 11/1973 | Stone et al. ............... 318/742 |
| 4,021,704 | A | * | 5/1977 | Norbeck ..................... 361/77 |
| 4,160,196 | A | * | 7/1979 | Ismatkhodzhaev et al. .. 318/749 |
| 4,163,270 | A | * | 7/1979 | Marus ........................ 361/77 |
| 4,461,986 | A | * | 7/1984 | Maynard et al. ............ 318/728 |
| 4,720,761 | A | | 1/1988 | Saletta et al. |
| 4,803,587 | A | | 2/1989 | Fournier et al. |
| 5,629,658 | A | * | 5/1997 | Chen ........................... 335/201 |
| 5,640,071 | A | * | 6/1997 | Malaspina et al. ........... 318/139 |
| 6,061,577 | A | * | 5/2000 | Andrieu et al. .............. 455/572 |
| 6,285,570 | B1 | * | 9/2001 | Schweigert et al. .......... 363/34 |
| 6,747,300 | B2 | * | 6/2004 | Nadd et al. .................. 257/288 |
| 7,256,560 | B2 | | 8/2007 | Beulich et al. |
| 2004/0155619 | A1 | * | 8/2004 | Hauselt et al. ............... 318/439 |
| 2005/0264246 | A1 | | 12/2005 | Beulich et al. |
| 2008/0225457 | A1 | | 9/2008 | Korrek |
| 2012/0299578 | A1 | | 11/2012 | Korrek |

FOREIGN PATENT DOCUMENTS

| | | |
|---|---|---|
| DE | 10219820 A1 | 11/2003 |
| EP | 0772216 A1 | 5/1997 |
| WO | WO 0233719 A1 | 4/2002 |
| WO | WO 2004027807 A1 | 4/2004 |

OTHER PUBLICATIONS

Chinese Office Action dated Jul. 3, 2013 for corresponding Chinese Application No. 200980109351.3.

* cited by examiner

COMPACT SWITCHGEAR FOR AN ELECTRICAL CONSUMER

PRIORITY STATEMENT

This application is the national phase under 35 U.S.C. §371 of PCT International Application No. PCT/EP2009/052190 which has an International filing date of Feb. 25, 2009, which designates the United States of America, and which claims priority on German patent application number DE 10 2008 018 254.0 filed Mar. 31, 2008, the entire contents of each of which are hereby incorporated herein by reference.

FIELD

At least one embodiment of the invention generally relates to compact switchgear for an electrical consumer, especially for a motor. The switchgear, especially in a form of embodiment as electromagnetic switchgear, comprises a power supply and a drive with a switching element, especially an electromagnetic switching element, e.g. a contactor or the like.

BACKGROUND

In a known manner, a power supply is able to be connected to an external power supply and also in a known manner, an external consumer, e.g. a motor, is able to be connected to the drive or to its switching element. With the drive or its switching element an operating voltage generated by the power supply of the switchgear is able to be supplied via an outgoing operating voltage line from the power supply to the consumer via the switching element. The respective consumer is then supplied with electrical power, i.e. activated, if the switching element is activated.

Switchgear is known per se, being referred to as a motor starter for example. The applicant of an embodiment of the present invention also offers under the designation "SIRIUS compact starter" a switching device also referred to as a universal motor starter, which fulfills the requirements in accordance with IEC/EN 60947-6-2 and combines the functions of a circuit breaker, an electronic overload relay and a contactor as a switching element in one housing and is able to be used wherever standard alternating current motors up to 32 A (appr. 400V) will be started directly. The compact starter is available as a direct or reversing starter.

In an embodiment as reversing starter the compact starter is characterized by the following components: Reversing starter, two removable main conductor terminal blocks, two six-pole removable auxiliary and control conductor terminal blocks, "overload" and "short circuit/malfunction" signal switches and internal auxiliary switches as well as two optional external auxiliary switch blocks (two normally open, two normally closed or one normally open and one normally closed). For locking the direction of rotation there is provision for the contactors of the reversing starter to be locked in relation to one another. This protective precaution prevents the contactors being simultaneously activated for the same direction of rotation and causing a short circuit. The contactors are locked both mechanically against shock stresses and also electrically against incorrect activation.

For mechanical contactor locking there is provision for a reversing gear to block the directions of rotation mechanically against one another. If the main contacts are closed for a first direction of rotation, the reversing gear prevents the simultaneous closing of the main contacts for the other direction of rotation and vice versa. For electrical contactor locking an auxiliary contact embodied as a normally closed contact is provided in the reversing starter for each direction of rotation. The control current of the other respective direction of rotation is looped through these auxiliary contacts. I.e. when the main contacts for the first direction of rotation are closed, the auxiliary contact opens and interrupts the control current circuit of the other direction of rotation and vice versa. This ensures that if a control voltage is present for one direction of rotation, the main contacts for the other direction of rotation will not be switched.

SUMMARY

With known devices of the type mentioned at the start, the inventors recognized that there is the need for function integration to be as extensive as possible i.e. the switchgear should perform as many functions previously realized externally as possible, with a simultaneous demand for reducing or at least keeping to the space occupied by such switchgear.

In at least one embodiment, switchgear is provided with a power supply integrated into a common housing and at least two drives, with the power supply able to be supplied with an external supply voltage and an external consumer able to be connected to the two drives. The fact that the switchgear comprises two drives makes functionality as a reversing starter possible in such a way that one of the drives is used for the first direction of rotation and the complementary drive for the opposite direction of rotation. Both drives are arranged along with other functionalities of the switchgear in a common housing so that overall compact switchgear is produced which thus contributes to improving the installation situation.

Previously reversing starters were realized with two externally-constructed standard contactors with locking for preventing a phase short circuit, an overload relay and a circuit breaker. At least one embodiment of the invention proposes the building in of two drives for one direction of movement in each case, e.g. running to the left or to the right, including current tracks, into a compact housing. Preferably a common overload detection and a common circuit breaker function can also be integrated into the housing. The compact design is made possible by a common electronic coil control for the two drives and, for the version with common electronic overload relay, by the use of an electronic overload relay jointly for both drives. All components are located on a printed circuit board, which makes possible both a very compact design and also minimization of the power loss. In addition the switchgear in accordance with at least one embodiment of the invention or in accordance with preferred forms of embodiment also makes possible locking of the two drive directions both electronically and also mechanically, including the necessary delay times for direct switchover for avoiding phase short circuits.

Advantageous embodiments of the invention are the subject matter of the subclaims. References back to other claims in such cases indicate the further embodiment of the subject matter of the main claim by the features of the respective subclaim; they are not to be understood as dispensing with the aim of a self-contained protection of the subject matter for the combinations of features of the referred-back subclaims. Furthermore, in respect of structuring the claims for a more detailed explanation of a feature in a subordinate claim, it is to be assumed that a such a restriction is not present in the previous claims in each case.

BRIEF DESCRIPTION OF THE DRAWINGS

An example embodiment of the invention is explained in greater detail below with reference to the drawings. Objects or elements corresponding to one another are provided with the same reference signs in all figures. The example embodiment or each example embodiment is not to be understood as restricting the invention. Instead numerous variations and modifications are possible within the framework of the current disclosure, especially such variants, elements and combinations which for example by combination or variation of individual features or elements or method steps described in conjunction with the general description and forms of embodiment as well as described in the claims and contained in the drawings are able to be derived by the person skilled in the art in respect of achieving the object and which lead by combinable features to a new object or to new method steps or sequences of method steps The figures show:

DETAILED DESCRIPTION OF THE EXAMPLE EMBODIMENTS

Figure 1:
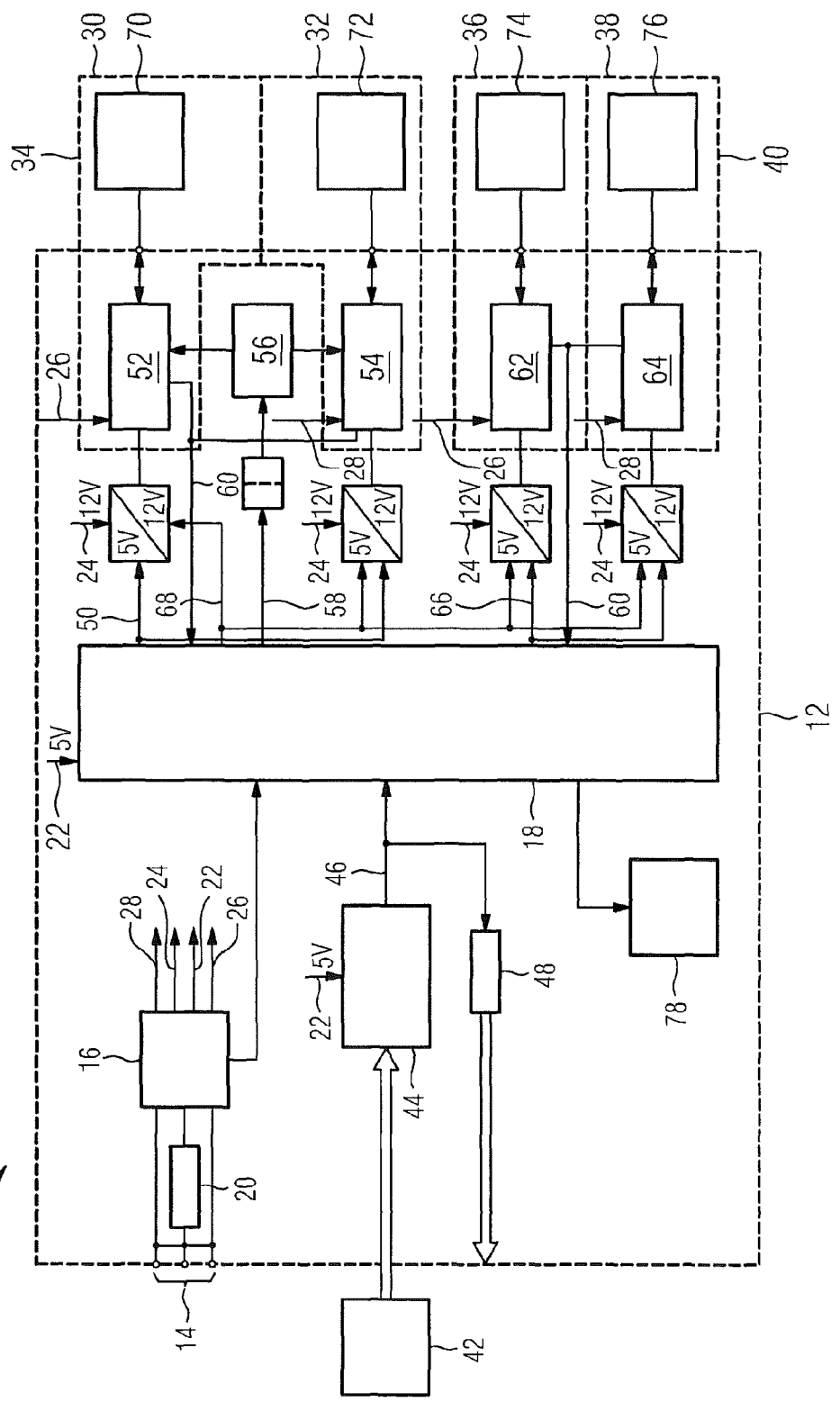
FIG. 1 compact switchgear in accordance with an embodiment of the invention.

FIG. 1 shows a schematically simplified diagram of switchgear in accordance with the invention in the form of a block diagram identified as a whole by the number 10. The switchgear 10 comprises an electronics section 12 to which contacts 14 for connecting a supply voltage, a power supply 16 and a control circuit 18 belong, which is implemented for example in the form of a controller e.g. an application-specific integrated circuit (ASIC) FPGA etc. Between the contact 14 and the power supplies 16 a further switching lock 20 is provided with which the electronics section 12 can be disconnected from the network, i.e. from the supply voltage which is present. The power supply 16 generates a first and a second operating voltage, 22, 24 e.g. 5V or 12V from the external supply voltage which is present. This first or second operating voltage 22, 24 is fed to other points of the electronics section 12 to the components there without this being indicated in the figure by solid-line conductor tracks. In this regard the reader is deferred to the use of the same reference signs. In addition the power supply 16 generates a first and second drive voltage 26, 28 for two drives included in the switchgear 10 which are grouped in a drive section 34. Like the first and second operating voltage 22, 24, no solid-line current tracks are shown for the first and second drive voltage 26, 28 in FIG. 1 and in this context the reader is again referred to the consistent use of the same reference signs. The first drive voltage 26 is fed to the first drive 30 and the second drive voltage 28 to the second drive 32. As well as the two drives 30, 32, the switchgear 10 also includes two so-called REL drives 36, 38 which are grouped together in a REL drive section. The first REL drive 36, just like the first drive 30, is fed the first drive voltage 26 and the second REL drive 38 is accordingly fed the second drive voltage 28.

For overload detection a consumer not shown in the diagram, i.e. a motor able to be connected to the drives 30, 32, is assigned a current converter 42 which is provided for a consumer driven by alternating current for measuring the three-phase currents. Measured values delivered by the current converter 42 are evaluated by a main current evaluation unit 44 and in the event of a predetermined threshold value being exceeded, an error signal 46 is generated which is able to be evaluated by means of the control circuit 18. With the error signal 46 an overload signal relay 48 assigned to both drives 30, 32 is also activated. On an output side the control circuit 18 generates an especially pulse-width-modulated drive activation signal 50. This is fed after a voltage conversion to a power stage 52, 54 provided for each drive 30, 32. The power stage 52 of the first drive 30 has the first drive voltage 26 applied to it in this case and the power stage 54 of the second drive 32 has the second drive voltage 28 applied to it. Both power stages 52 is assigned a free-wheeling circuit 56, which is protected by an optical disconnection and reacts to a free-wheeling circuit control signal 58. The two power stages 52, 54 return a drive current signal 62 to the control circuit 18. The REL drive section 40 is essentially constructed in a similar manner to the drive section 34 and in this context the reader is referred to the description given there. The REL drive section 40 also comprises two power stages 62, 64 to which an especially pulse-width-modulated REL activation signal 66 is able to be fed. For mutual locking a locking signal 68 able to the output by the control circuit 18 is provided.

Each drive 30, 32 and also each REL drive 36, 38 includes a main drive unit 70, 72, 74, 76. In the event of an error established by the control circuit 18 as a result of internal processing or signaled by input signals, such as the error signal 46 or the drive current signal 60, the display unit 78 is activated. The drives 30, 32 and/or the REL drives 36, 38 can be assigned a common circuit breaker (not shown) which trips in the event of overcurrents or other error situations. Such a circuit breaker is also simultaneously assigned to the main current tracks to the monitored and trips if an overcurrent situation is present in one of the main current tracks.

Figure 2:
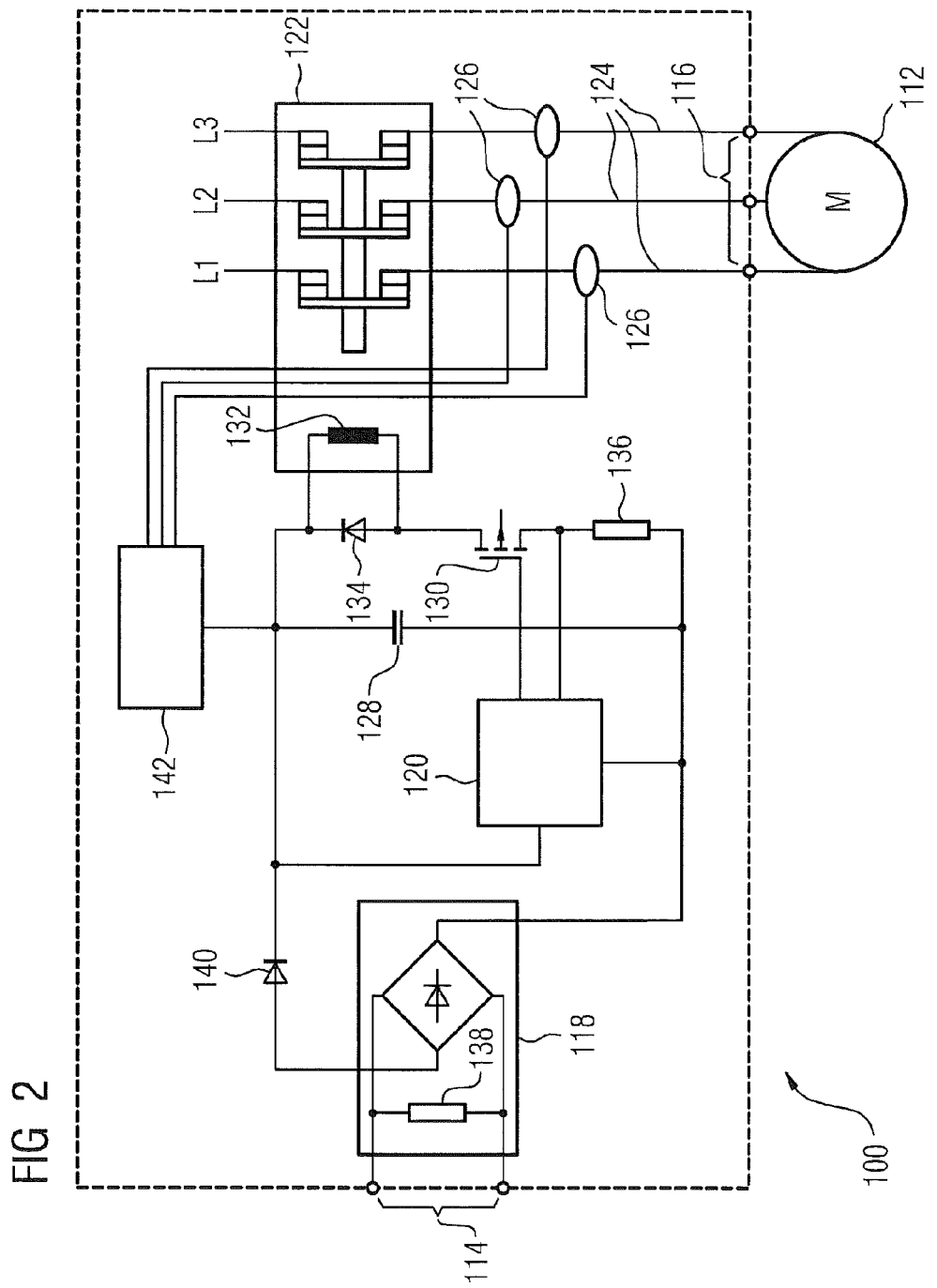
FIG. 2 a schematically simplified basic diagram of the switchgear with a functionality able to the integrated into the compact switchgear in accordance with FIG. 1, FIG. 3 a schematically simplified basic diagram of further switchgear with a further functionality able to be integrated into the compact switchgear in accordance with FIG. 1, FIG. 4 to FIG. 6 Signal curves for voltages able to be measured in an input branch of the switchgear shown in FIG. 3.

The switchgear 10 can be supplemented for preferred forms of embodiment by a functionality as is shown in FIG. 2 but is shown for only one drive in this diagram however.

FIG. 2 shows a schematically simplified diagram of electrical switchgear 100 for controlling a consumer 112 connected to said switchgear, e.g. a motor M. The switchgear 100 comprises an input 114, an output 116, a power supply 118, a control circuit 120 and a switching element 122. During operation of the switchgear 100 the power supply 118 is able to be supplied with an external supply voltage via the input 114. The switching element 122 is able to be activated by the control circuit 120 arranged downstream from the power supply 118. The consumer 112 connected to the output 116 is able to be supplied with the switching element 122 via power supply lines 124 with a supply voltage. The switching element 122 is either an electromechanical switching element, i.e. a contactor or the like for example, or an electronic switching element, i.e. a transistor, thyristor or similar for example. At least one supply voltage line 114 is assigned a converter 126 which is effective in the operation of the switchgear 100 for charging a buffer capacitor 128 connected downstream from the control circuit 122. Shown in the figure is a form of embodiment in which each supply voltage line 124 is assigned precisely 1 transformer 126.

A control circuit 120 is connected between two outputs of the power supply 118. The buffer capacitor 128 is connected in parallel to the control circuit 120. This means that on the one hand the buffer capacitor 120 effects of a stabilization of an operating voltage generated by the power supply 118 and on the other hand continue as peripheral conditions as a result of the smooth or stabilized operating voltage are produced for the control circuit 120 which reacts to the operating voltage.

A switch 130 is able to be activated by the control circuit 120 which effects activation of the switching element 122 during operation in the activated state. The fact that the buffer capacitor is also connected in parallel to this switch 130 means that the buffer capacitor 128 also causes a stabilization of a current flowing via the switch 130 in the activated state. The switching element 122 is connected in series with the switch 130, which is represented as a transistor, i.e. a switch able to be activated electronically, and the inductor provided for activation. The buffer capacitor 128 is also connected in parallel to this series circuit of switch 130 and inductor 132. A freewheeling diode 134 is provided in parallel to the inductor 132 which serves in a known manner as a protection against overvoltage on switching off the inductor 132. In series with the switch 130 and the parallel circuit comprising inductor 132 and freewheeling diode 134 there is a series resistor. Further details of the circuit of the electrical switchgear 100 are an input resistor 138 and a decoupling diode 140.

Between the transformer or each transformer 126 and the buffer capacitor 128 is arranged a transformer processor 142. The transformer processor 142 converts currents or voltages obtained from one or more transformers 126 such that the buffer capacitor 128 is charged exclusively. In the case of only one transformer 126 this can for example be a rectification of received voltages or currents. In the case of three supply lines 124 as shown, for connecting an alternating current load, i.e. a motor M for example as the consumer 112, the transformer processor 142 acts so that in operation a current exclusively charging the buffer capacitor 128 is generated from the phase-shifted voltages delivered to the transformers 126.

For a transfer of the functionality shown in FIG. 2 for the switchgear 100, namely the use of the transformer or each transformer 126 shown there for charging the buffer capacitor 128, the control circuit 18 (FIG. 1) is assigned a buffer capacitor, as is shown in FIG. 2 by the buffer capacitor 128 for the control circuit 20 in this figure. The transformer or each transformer 126 is assigned a motor connected to the two drives 30, 32 as a consumer and the buffer capacitor 128 is charged via the transformer or each transformer 126 with a function unit corresponding to the transformer processor 142 (FIG. 2).

For integration of the functionality of the switchgear 100 in accordance with FIG. 2 into the switchgear 10 shown in FIG. 1, switchgear is thus produced for which the charging of a buffer capacitor 128 is undertaken by one or more main current tracks, here designated as power supply line 124. For defined, controlled charging of the buffer capacitor 128 the transformer processor 142 is provided. For switchgear 10; 100 with this type of circuit the buffer capacitor 128 does not generate any charge current peaks on the supply side. The supply network is thus not subjected to any strain and the EMC circuit outlay is reduced. The buffering means that any clocked coils included in the switched-mode power supply do not have a critical effect in the EMC terms. Thus charge currents and also pulsed currents are captured by the buffer capacitor 128. The constant flow of current back into the buffer capacitor 128 also achieves a reduction of the electrical energy to be provided by the power supply 118.

Figure 3:
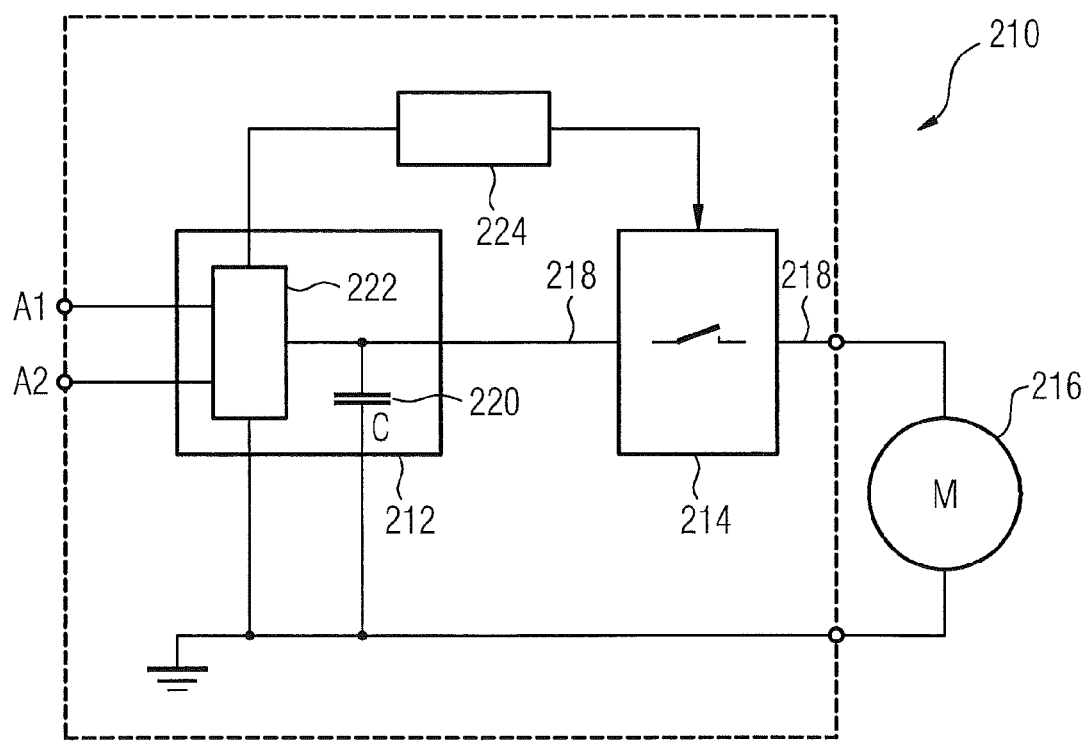

FIG. 3 shows a form of embodiment of switchgear 210 with a drive in which, for switching off of a consumer 216 connected thereto, e.g. a motor M, the latter is briefly supplied with power from an electrical energy accumulator 220. The brief switching on of the respective consumer 216 will discharge an energy accumulator intended to improve EMC properties assigned to a power supply 212 so that a voltage evaluation on switching off the consumer is not unfavorably influenced by any charging of the energy accumulator 220.

Figure 4:
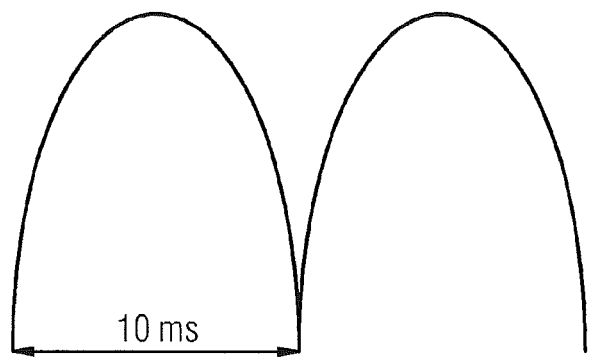

Either the transformer 222 and/or the control circuit 224 carry out an evaluation of the external supply voltage. To this end data relating to the external supply voltage able to be connected to the terminals A1, A2 is collected as voltage evaluation over a defined period of time and an average value is calculated. In addition a decision is made as to whether an AC voltage or a DC voltage is present as the external supply voltage. Peak values are known to be higher for AC voltage than for DC voltage. It for example an AC voltage is present as the external supply voltage, this is rectified by the transformer 222, as FIG. 4 shows.

Figure 5:
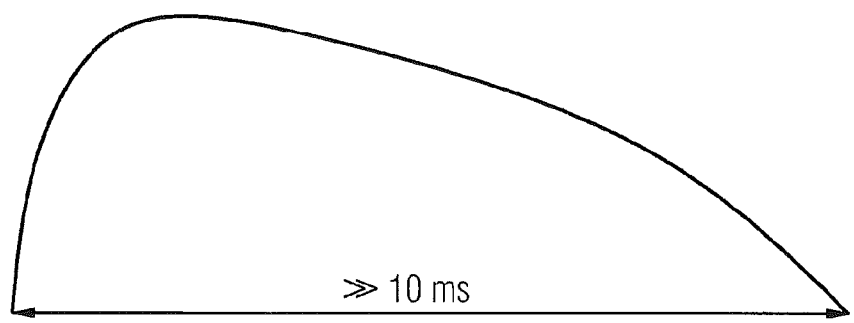

If the external supply voltage is switched off, the energy accumulator 220 discharges, i.e. the capacitor C in the case shown and a signal form can be produced for the voltage evaluation, as is shown in FIG. 5. With such a signal form the average value is falsified such that a voltage which is too high is detected by the voltage evaluation. Because of missing zero crossings it can also occur that an incorrect type of voltage is assumed, here for example direct current voltage. As a result of such incorrect evaluation it can occur that the consumer 216 is connected again unintentionally.

Figure 6:
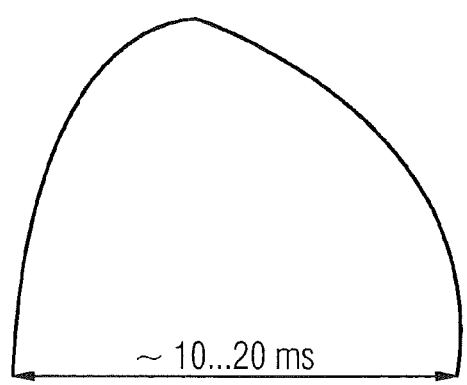

To avoid this there is provision that, when the consumer 216 is switched off, i.e. when the external supply voltage is removed, the latter is supplied for a brief period by activation of switching elements 214 by the energy accumulated in the electrical energy accumulator 220. In this way the energy accumulator 220 is discharged in a defined and controlled manner such that a signal is produced for the voltage evaluation, as is shown by way of example in FIG. 6. The energy accumulator 220 will also be discharged very much more quickly than is the case in the situation depicted in FIG. 5. Incorrect voltage evaluations are thus effectively prevented or at least reduced.

For a controlled and defined discharging of the energy accumulator 220 there is provision for the short-term supply of power to the respective consumer 216 from the remaining electrical residual energy in the energy accumulator 220 to be undertaken during a predetermined or predeterminable discharge period. This is especially matched to a storage capacity of the energy accumulator 220 and an inertia of the consumer 216, such that the energy accumulator 220 is sufficiently discharged and the consumer 216, if at all, is only imperceptibly put into operation. With a motor M as an example of a consumer 216, with a sufficiently short supply of power—i.e. a sufficiently short discharge time during which such a supply of power is undertaken—as a result of the mass inertia of the movable components involved, no undesired movement is to be feared. The short supply of power to the respective consumer 216 is undertaken after a predetermined or predeterminable wait time after removal of the external supply voltage. The control circuit 224 includes hardware and/or software means that this purpose for implementing the described method. In particular the wait and discharge time is encoded into the control circuit 224 for this purpose. By means of the control circuit 224 after the consumer 216 is switched off by removing the external supply voltage, the expiry of the wait time is awaited and after the wait time of the consumer 216 has expired, power is supplied for the duration of the discharge time so that the energy accumulator 220 is discharged or at least sufficiently discharged.

The energy accumulator 220 shown in FIG. 3 for the power supply 212 there can be integrated into the power supply 16 of the switchgear 10 in accordance with FIG. 1. The functionality of the control circuit 224 shown in FIG. 3 is integrated into the control circuit 18 in accordance with FIG. 1 and the signal shown as able to be generated by the control circuit 224 in FIG. 3 acts directly on the first or second drive 30, 32, namely a switching element included thereby in the manner of the switching element 214 shown in FIG. 3. The brief activation of one of the drives 30, 32 successfully safely discharges a buffer capacitor 128 assigned to the power supply (cf. FIG. 3; reference sign 220). In addition an evaluation of the external supply voltage uninfluenced by any residual charging of the buffer capacitor 218 is successful. The use or the ability to use a buffer capacitor 128 finally allows an improvement of EMC properties of the switchgear 10 (FIG. 1).

Thus an embodiment of the invention can be briefly presented as follows:

Electrical switchgear 100 is specified in which the charging of a buffer capacitor 128 is undertaken via one or more main current tracks here designated as the power supply line 124. For defined, controlled charging of the buffer capacitor 128 a transformer processor 142 is provided. For switchgear 100 with such a circuit, the buffer capacitor 128 does not generate any charge current peaks on the supply side. The supply network is thus not subjected to a load and the EMC circuit outlay is reduced. The buffering means that any clocked coils included in a switch mode power supply for example do not have a critical effect. Thus charge currents and also pulsed currents are captured by the buffer capacitor 128. By the constant return flow of current into the buffer capacitor 128 a reduction of the electrical energy to be provided by the power supply 118 is also achieved.

With switchgear 210 of the type described here, especially low-voltage switchgear, current tracks, i.e. the operating current line 218 or each operating current line described here can be connected between an electrical supply device and consumers 216 and thereby their operating currents. I.e. since current paths are opened by means of switchgear 210, especially by way of a switching elements 214 included in it, the connected consumers 216 can be safely switched on and switched off. The electrical low-voltage switching element 214, such as a contactor, a circuit breaker, a compact starter etc for example, has one or more main contacts for switching the current tracks which can be controlled by one or more control magnets by means of a control circuit 224 provided for this purpose. To avoid incorrect voltage evaluations in the area of a power supply 212 while simultaneously obtaining a sufficient electromagnetic compatibility, an electrical energy accumulator 220 provided for EMC considerations, especially a capacitor, is discharged in a controlled manner so that when the respective consumer 216 is switched off, this is briefly supplied with power by the controlled activation of the switching element 214 from the energy still stored in the energy accumulator 220.

On integration of the functionality of the switchgear 200 in accordance with FIG. 3 into the switchgear 10 shown in FIG. 1 switchgear is produced with which current parts, i.e. the operating voltage line 218 or each operating voltage line described here, can be connected between an electrical power supply device and consumers 216 and thereby their operating currents. I.e. in that current tracks are opened by the switchgear 10; 200, especially by means of a switching element 14 included therein, the connected consumers can be safely switched on and switched off. An electrical low-voltage switching element 14, such as a contactor, a circuit breaker, a compact starter etc for example, has one or more main contacts for switching the current tracks which can be controlled by one or more control magnets by means of a control circuit 18; 224 provided for the purpose. To avoid incorrect voltage evaluations in the area of a power supply 16; 212, while simultaneously obtaining a sufficient electromagnetic compatibility, an energy accumulator 220 provided for EMC considerations, especially a capacitor, is discharged in a controlled manner, when the respective consumer 216 is switched off, by this being supplied for a short period with energy still stored in the energy accumulator 20 by controlled activation of the switching element 214.

In summary, an embodiment of the invention can thus briefly be described as follows: Switchgear 10 with a power supply integrated into a common housing and at least two drives 30, 32, with the power supply 16 able to be supplied by an external supply voltage and an external consumer able to be connected to the two drives 30, 32, with the switchgear 10 especially including in the same housing and integrated overload detection and 42 in both drives 30, 32 and/or an integrated circuit breaker function for both drives 30, 32 and/or an integrated control circuit 18 for common control of both drives 30, 32, and with the switchgear 10 optionally being supplemented by a functionality for explicit charging of a buffer capacitor 128 and/or with an energy accumulator 228 by a functionality for its explicit discharging by brief supply of power to a connected consumer 216.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. Switchgear, comprising:
   a power supply integrated into a shared housing;
   a capacitor configured to store electrical energy;
   at least two drives, the power supply being suppliable with an external supply voltage and an external consumer being connectable to the at least two drives, at least one of the at least two drives being configured to drive the external consumer in a first operation mode and at least one other of the at least two drives being configured to drive the external consumer in a second operation mode, the first operation mode having a different effect on the external consumer compared to the second operation mode; and
   at least one switch configured to, when the external consumer is switched off, cause the capacitor to supply the stored electrical energy to the power supply, wherein one of the at least two drives is configured to be activated by a control circuit connected downstream from the power supply by a supply voltage being fed over supply voltage lines in operation to the external consumer, and
   at least one of the supply voltage lines and each of the supply voltage lines is assigned a transformer which is effective in operation for charging the capacitor connected downstream from the control circuit.

2. The switchgear as claimed in claim 1, wherein the at least two drives are configured to share an overload detection device that is integrated into the shared housing.

3. The switchgear as claimed in claim 2, wherein the at least two drives are configured to share a circuit breaker function that is integrated into the shared housing.

4. The switchgear as claimed in claim 3, wherein the at least two drives are configured to share the control circuit for common control of the at least two drives, the control circuit being integrated into the shared housing.

5. The switchgear as claimed in claim 2, wherein the at least two drives are configured to share the control circuit for common control of the at least two drives, the control circuit being integrated into the shared housing.

6. The switchgear as claimed in claim 1, wherein the at least two drives are configured to share a circuit breaker function that is integrated into the shared housing.

7. The switchgear as claimed in claim 6, wherein the at least two drives are configured to share the control circuit for common control of the at least two drives, the control circuit being integrated into the shared housing.

8. The switchgear as claimed in claim 1, wherein the at least two drives are configured to share the control circuit for common control of the at least two drives, the control circuit being integrated into the shared housing.

9. A method for operating switchgear including a power supply integrated into a shared housing and at least two drives, the method comprising:
  supplying the power supply with an external supply voltage, an external consumer being connected to the at least two drives and the switchgear including at least one electrical energy accumulator, the external supply voltage being switchable between an operating voltage line and a reference potential;
  driving, by the at least two drives, the external consumer in one of a first operation mode and a second operation mode, the first operation mode being associated with at least one of the at least two drives, the second operation mode being associated with at least one other of the at least two drives, the first operation mode having a different effect on the external consumer than the second operation mode; and
  switching off the external consumer such that the power supply is supplied with power for a short period by the at least one electrical energy accumulator after expiry of a wait time, wherein,
    the short period corresponds to a discharge time, the discharge time being a time during which the at least one electrical energy accumulator discharges,
    the wait time and the discharge time are encoded in a control circuit, the wait time being a time after the external consumer is switched off, and
    the expiry of the wait time is established by way of the control circuit.

10. The method as claimed in claim 9, wherein a duration of the discharge time is matched to at least one of
  a storage capacity of the energy accumulator and an inertia of the external consumer.

11. Switchgear, comprising:
  at least two drives;
  a capacitor as an electrical energy accumulator; and
  a control circuit for supplying a power supply with an external supply voltage, an external consumer being connected to the at least two drives, the external supply voltage being switchable between an operating voltage line and a reference potential, wherein,
    when the external consumer is switched off, the power supply is supplied with power for a short period by the electrical energy accumulator,
    at least one of the at least two drives is configured to drive the external consumer in a first operation mode and at least one other of the at least two drives is configured to drive the external consumer in a second operation mode, the first operation mode having a different effect on the external consumer compared to the second operation mode,
    a wait time and a discharge time are encoded in the control circuit, the wait time being a time after the external consumer is switched off, the discharge time being a time during which the capacitor discharges,
    the expiry of the wait time is established by way of the control circuit, and
    after expiry of the wait time, the external consumer is supplied with current for the duration of the discharge time.

12. The switchgear as claimed in claim 11, wherein,
  one of the at least two drives is configured to be activated by the control circuit connected downstream from the power supply by a supply voltage being fed over supply voltage lines in operation to the external consumer, and
  at least one of the supply voltage lines and each of the supply voltage lines is assigned a transformer which is effective in operation for charging the capacitor connected downstream from the control circuit.

13. The switchgear as claimed in claim 12, wherein a transformer processor is arranged between the transformer or each transformer and the capacitor, which in operation generates a current for charging the capacitor from a voltage delivered by the transformer or each transformer.

14. A method for operating switchgear including a power supply integrated into a shared housing and at least two drives, the method comprising:
  supplying the power supply with an external supply voltage, an external consumer being connected to the at least two drives and the switchgear including at least one electrical energy accumulator, the external supply voltage being switchable between an operating voltage line and a reference potential, wherein,
    when the external consumer is switched off, the power supply is supplied with power for a short period by the at least one electrical energy accumulator, and the power is supplied during a predetermined or predeterminable discharge time,
    a duration of the discharge time is matched to at least one of a storage capacity of the energy accumulator and an inertia of the external consumer, and
    the supplied power occurs a predetermined or predeterminable wait time after the external consumer is switched off,
    the wait time and the discharge time are encoded in a control circuit, and
    the expiry of the wait time is established by way of the control circuit.

15. Switchgear, comprising:
  a control circuit for supplying the power supply with an external supply voltage, an external consumer being connected to at least two drives and the power supply including at least one electrical energy accumulator, the external supply voltage being switchable between an operating voltage line and a reference potential, wherein,
    when the external consumer is switched off, the external consumer is supplied with power for a short period by the at least one electrical energy accumulator, and
    a wait time and a discharge time are encoded in the control circuit, the wait time being a time after the external consumer is switched off, the discharge time being a time during which the at least one electrical energy accumulator discharges, the expiry of the wait time being established by way of the control circuit, and after expiry of the wait time the external consumer is supplied with current for the duration of the discharge time.

16. Switchgear, comprising:
  a control circuit for supplying the power supply with an external supply voltage, an external consumer being connected to at least two drives and the power supply including at least one electrical energy accumulator, the external supply voltage being switchable between an operating voltage line and a reference potential, wherein, when the external consumer is switched off, the external consumer is supplied with power for a short period by the at least one electrical energy accumulator, one of the drives is configured to be activated by the control circuit connected downstream from the power supply by a supply voltage being fed over supply voltage lines in operation to the external consumer, and at least one of the supply voltage lines and each of the supply voltage lines is assigned a transformer which is effective in operation for charging the at least one electrical energy accumulator connected downstream from the control circuit.

* * * * *